United States Patent
Alava et al.

(10) Patent No.: US 12,361,496 B1
(45) Date of Patent: Jul. 15, 2025

(54) SYSTEMS AND METHODS FOR USING HOME TELEMATICS FOR MAINTENANCE BEHAVIOR CHECK

(71) Applicant: United Services Automobile Association (USAA), San Antonio, TX (US)

(72) Inventors: Galo M. Alava, Tampa, FL (US); Amanda Michelle Boyd, Denver, CO (US); Ramsey Devereaux, San Antonio, TX (US); Michael Kyne, Saint Petersburg, FL (US); Gregory Mark Lamontagne, Helotes, TX (US); Elizabeth J. Rubin, San Antonio, TX (US); Courtney St. Martin, Forney, TX (US); Brian Tougas, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 134 days.

(21) Appl. No.: 17/731,459

(22) Filed: Apr. 28, 2022

Related U.S. Application Data (60) Provisional application No. 63/181,027, filed on Apr. 28, 2021.

(51) Int. Cl.
| | | |
|---|---|---|
| *G06Q 40/08* | (2012.01) | |
| *G06Q 50/163* | (2024.01) | |
| *G06V 10/74* | (2022.01) | |
| *G06V 20/52* | (2022.01) | |
| *G06V 40/10* | (2022.01) | |
| *G06V 40/20* | (2022.01) | |

(52) U.S. Cl.
CPC .......... *G06Q 40/08* (2013.01); *G06Q 50/163* (2013.01); *G06V 10/761* (2022.01); *G06V 20/52* (2022.01); *G06V 40/10* (2022.01); *G06V 40/20* (2022.01)

(58) Field of Classification Search
USPC .......................................................... 705/4
See application file for complete search history.

(56) References Cited

U.S. PATENT DOCUMENTS

| | | | | |
|---|---|---|---|---|
| 11,195,358 | B2 * | 12/2021 | Moore | G07C 9/28 |
| 11,676,225 | B1 * | 6/2023 | Catalano | G06Q 50/16 |
| | | | | 705/313 |
| 11,922,284 | B1 * | 3/2024 | Pirozzi | G06N 5/04 |
| 2016/0335725 | A1 * | 11/2016 | Philbrick | G06Q 40/08 |
| 2019/0251645 | A1 * | 8/2019 | Winans | G06Q 40/08 |
| 2022/0028567 | A1 * | 1/2022 | Aspro | G16Y 40/40 |
| 2022/0270176 | A1 * | 8/2022 | Chintakindi | G06F 3/0482 |

* cited by examiner

*Primary Examiner* — Hani M Kazimi
(74) *Attorney, Agent, or Firm* — Fletcher Yoder, P.C.

(57) ABSTRACT

A method may include retrieving, via a processor of a computing system, insurance information associated with a user and receiving one or more alerts regarding an event that will occur within a determined radius of one or more properties within a period of time. The computing system may then determine a list of actions for the user to perform on the property based on the event and send the list of actions to a computing device associated with the user. Based on whether the user completes the list of actions, a premium rate of the user may be adjusted.

13 Claims, 4 Drawing Sheets

SYSTEMS AND METHODS FOR USING HOME TELEMATICS FOR MAINTENANCE BEHAVIOR CHECK

CROSS-REFERENCE TO RELATED APPLICATION

The present application claims benefit of and priority to U.S. Provisional Patent Application Ser. No. 63/181,027, titled "Systems and Methods Using Home Telematics for Maintenance Behavior Check," which was filed on Apr. 28, 2021, and which is herein incorporated by reference in its entirety for all purposes.

BACKGROUND

The present disclosure relates generally to systems and methods for recommending and monitoring performance of maintenance operations on property. More particularly, the present disclosure is related to recommending a set of actions for a user to perform in light of an impending event and monitoring the user's behavior in view of the recommendation.

Insurance premiums are generally a fixed annual premium cost based on a value of a property being insured, risk factors associated with an individual insuring the property, and the like. Certain types of property, such as homes and vehicles, may avoid certain types of depreciation if the property is properly maintained. As such, improved techniques for providing notifications for maintaining property may be desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include a retrieving, via a processor, insurance information associated with a user. The insurance information may be indicative of a premium rate and a property. The method may include receiving one or more alerts regarding an event that will occur within a determined radius of the property within a period of time. Further, the method may include determining a list of actions for the user to perform on the property based on the event. The list of actions may include a first set of actions to perform before the event occurs and a second set of actions to perform after the event occurs. The method may include sending the list of actions to a computing device associated with the user and receiving one or more datasets representative of one or more portions of the property from one or more sensors. The one or more portions of the property are specified in at least one action of the list actions. Moreover, the method may include determining that the at least one action is complete based on the one or more datasets and adjusting the premium rate in response to the at least one action being completed.

In another embodiment, a non-transitory computer-readable medium may include computer-executable instructions that, when executed by at least one processor, are configured to cause the at least one processor to perform operations that include retrieving insurance information associated with a user. The insurance information is indicative of a premium rate associated with a health of the user. The computer-executable instructions may cause the at least one processor to receive one or more alerts regarding an event that will occur within a determined radius of the user within a period of time. The computer-executable instructions may cause the at least one processor to determine a list of actions for the user to perform based on the event. The list of actions may include a first set of actions to perform before the event occurs and a second set of actions to perform after the event occurs. Further, the computer-executable instructions may cause the at least one processor to send the list of actions to a computing device associated with the user and receive one or more datasets representative of one or more behaviors of the user from one or more sensors. The one or more behaviors of the user are specified in at least one action of the list actions. Moreover, the computer-executable instructions may cause the at least one processor to determine that the at least one action is complete based on the one or more datasets and adjust the premium rate in response to the at least one action being completed.

In another embodiment, a system may include one or more sensors configured to acquire image data associated with one or more portions of a property and a processor. The processor may be configured to retrieve insurance information associated with a user. The insurance information is indicative of a premium rate and a property. The processor may receive one or more alerts regarding an event that will occur within a determined radius of the property within a period of time, and determine a list of actions for the user to perform on the property based on the event. The list of actions comprises a first set of actions to perform before the event occurs and a second set of actions to perform after the event occurs. Further, the processor may send the list of actions to a computing device associated with the user, and receive one or more datasets representative of one or more portions of the property from the one or more sensors. The one or more portions of the property are specified in at least one action of the list actions. Moreover, the processor may determine that the at least one action is complete based on the one or more datasets, and adjust the premium rate in response to the at least one action being completed.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Insurance premium rates are commonly determined on a semi-annual or annual basis for a user based on certain information regarding the user and the type of coverage that the user is seeking. For instance, when determining an insurance premium rate associated with a particular property (e.g., home, vehicle) owned by the user, a computing system may analyze a maintenance record of the property, information regarding the property being insured, and the like. Using this information, the computing system may generate an annual premium rate typically to be paid in equal installments throughout the year (e.g., monthly).

With this in mind, information regarding the user's maintenance record concerning the insured property may be useful for insurance providers to determine the premium rate for providing the insurance services. Moreover, insurance customers may receive more favorable premium rates based on maintenance practices and tasks performed for the insured property. With this in mind, in certain embodiments, an insurance rate system may provide more flexible and personal framework determining insurance rates to provide insurance coverage and rates that dynamically changes based on the individual customer's maintenance and behavior with regard to the insured property. The dynamic rate changes may cause insurance customers to better maintain their property, thereby providing more control over the cost of their insurance premium rates. To assist insurance providers in providing competitive rates based on maintenance or behavior (e.g., lifestyle), computing systems in accordance with present embodiments may determine a base insurance premium rate on data regarding the user based on certain data sources that may determine a risk level associated with the user.

In addition, computing systems in accordance with present embodiments may monitor a user's maintenance operations in response to recommended maintenance task notification sent to the user's computing device. As such, the monitored parameters, in some embodiments, may be used by computing systems to determine or attribute discounts for certain individuals. Additional details regarding systems and techniques for generating personal variable insurance rates and discounts will be discussed below with reference to FIGS. 1-4. Although the system is described as determining a premium rate, it should be understood that the present disclosure is applicable to determining a discount or other financial incentives based on maintenance and behavior of the user.

Figure 1:
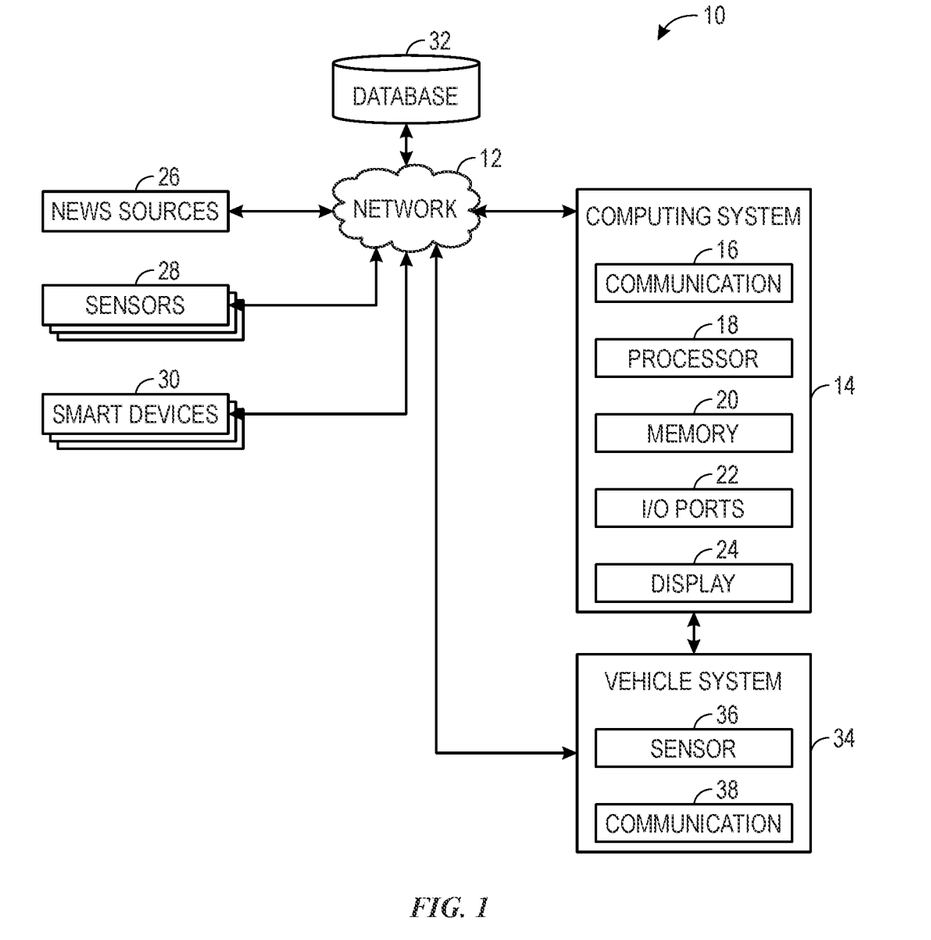
FIG. 1 illustrates a block diagram of a system communicatively coupled to a number of data sources, in accordance with embodiments described herein.

By way of introduction, FIG. 1 is a block diagram of a system 10 that may include a network 12. The network 12 may correspond to any suitable communication network for facilitating data communication between various data sources in the system 10. The network 12 may thus include the Internet, an Intranet system, and the like. As shown in FIG. 1, the network 12 may be communicatively coupled to a computing system 14. The computing system 14 may include any suitable computer device, such as a general-purpose personal computer, a laptop computer, a tablet computer, a mobile computer, and the like. The computing system 14 may include various types of components that may work together to perform various types of computer tasks and operations. For example, the computing system 14 may include a communication component 16, a processor 18, a memory 20, input/output (I/O) ports 22, a display 24, and the like. The communication component 16 may be a wireless or wired communication component that may facilitate communication between the network and various other components of the system 10 via a network, the Internet, or the like.

The processor 18 may be any type of computer processor or microprocessor capable of executing computer-executable code. The processor 18 may also include multiple processors that may perform the operations described below.

The memory 20 may be any suitable articles of manufacture that can serve as media to store processor-executable code, data, or the like. These articles of manufacture may represent computer-readable media (e.g., any suitable form of memory or storage) that may store the processor-executable code used by the processor 18 to perform the presently disclosed techniques. As used herein, applications may include any suitable computer software or program that may be installed onto the computing system 14 and executed by the processor 18. The memory 20 may represent non-transitory computer-readable media (e.g., any suitable form of memory or storage) that may store the processor-executable code used by the processor 18 to perform various techniques described herein. It should be noted that non-transitory merely indicates that the media is tangible and not a signal.

The I/O ports 22 may be interfaces that may couple to other peripheral components such as input devices (e.g., keyboard, mouse), sensors, input/output (I/O) modules, and the like. The display 24 may operate as a human machine interface (HMI) to depict visualizations associated with software or executable code being processed by the processor 18. In one embodiment, the display 24 may be a touch display capable of receiving inputs from a user of the computing system 14. The display 24 may be any suitable type of display, such as a liquid crystal display (LCD), plasma display, or an organic light emitting diode (OLED) display, for example. Additionally, in one embodiment, the display 24 may be provided in conjunction with a touch-sensitive mechanism (e.g., a touch screen). It should be noted that the components described above with regard to the computing system 14 are examples and the computing system 14 may include additional or fewer components relative to the illustrated embodiment.

Additionally, the system 10 may include news sources 26, sensors 28, and one or more smart devices 30 that may be installed in the user's property (e.g., home or vehicle) to monitor maintenance. In some embodiments, the network 12 may receive news alerts from news sources 26. The news sources 26 may be any suitable local news source that provides information and/or alerts relevant to viewers in the area of coverage. That is, the news sources 26 may include Internet websites, social media feeds, document databases, and any other suitable source of real-time data accessible via the network 12.

The sensors 28 may include any device capable of detecting certain types of data associated with a particular property. For instance, the sensors 28 may detect a location, a moisture level, a temperature level, and the like. The sensors 28 may include image data sensors (e.g., cameras), audio data sensors (e.g., microphones), and other types of sensors that may acquire data related to a surrounding of the property. The sensors 28 may include communication components that may enable the sensors 28 to be communicatively coupled to the network 12.

One or more sensors 28 may be disposed on different types of property such as a home, a vehicle, and the like. In certain embodiments, one or more sensors 28 may be disposed within certain rooms of the home, outside the home, and within the vehicle. For example, the sensors 28 may be disposed on smart devices 30, mobile phones, wearable electronics, and the like. In one embodiment, the sensors 28 may provide location information regarding the sensors 28. As such, the sensors 28 may provide global positioning system (GPS) coordinates and the like to indicate locations of the sensors 28.

The smart devices 30 may include computing devices that are capable of receiving voice commands or input commands (e.g., via a mobile computing device) and controlling other devices based on the commands. For instance, the smart device 30 may receive a voice command or an input command via the computing system 14 to change an operation of a thermostat device, a locking mechanism device, or other device that may be disposed in a home or a vehicle. The smart devices 30 may be communicatively coupled to the respective devices via the network 12 In addition, the smart devices 30 may include the sensors 28 and receive data concerning certain properties of the surrounding environment, behavior patterns of the user, and the like. As such, the smart devices 30 be positioned in various rooms of a home (e.g., kitchen, bedroom, living room, etc.) to monitor the behavior of the user in the home, in a vehicle to monitor operations of the vehicle or user behavior in the vehicle, and the like.

In some embodiments, the network 12 may also be communicatively coupled to one or more databases 32, which may store data regarding individuals such as, maintenance records, credit information, banking information, and other information that may be publicly available regarding the individuals and relevant for obtaining insurance. In addition, the database 32 may include an exposed application programming interface (API) that provides data services regarding the customer's account information. That is, the computing system 14 may query the database via the API to efficiently gather information regarding a particular user. Although the database 32 is described as being communicatively coupled to the computing system 14 via the network 12, it should be noted that, in other embodiments, the computing system 14 and the database 32 may be communicatively coupled directly to one another.

In addition to the database 32, the system 10 may also include a vehicle system 34 that may monitor one or more properties of a vehicle. For example the vehicle system 34 may monitor locations in which the vehicle travels, speeds at which the vehicle is used, braking patterns employed by particular drivers, mobile phone activity/operations while the vehicle is in motion, audio equipment use in the vehicle, and the like.

With the foregoing in mind, the computing system 14 may receive insurance policy data regarding a user and associated property. As mentioned above, the property may be any physical structure or object that may be covered by an insurance policy. To better enable the user to maintain the property, the computing system 14 may provide recommended maintenance or preventative operations for the user to perform in view of an expected event. For instance, the computing system 14 may receive information related to a weather event approaching the insured property. Based on weather data or other events that are expected to occur near the insured property, the computing system 14 may send a recommendation for the user to perform certain maintenance or preventative operations on the property. The computing system 14 may then detect via sensors 28 or other suitable devices whether the maintenance operations were performed. The performance of these maintenance operations may indicate to the computing system 14 that the user is responsive to maintenance requests and thus may be associated with less risky behavior that may result in damage to the property as compared to a user who is unresponsive to the recommendations.

Figure 2:
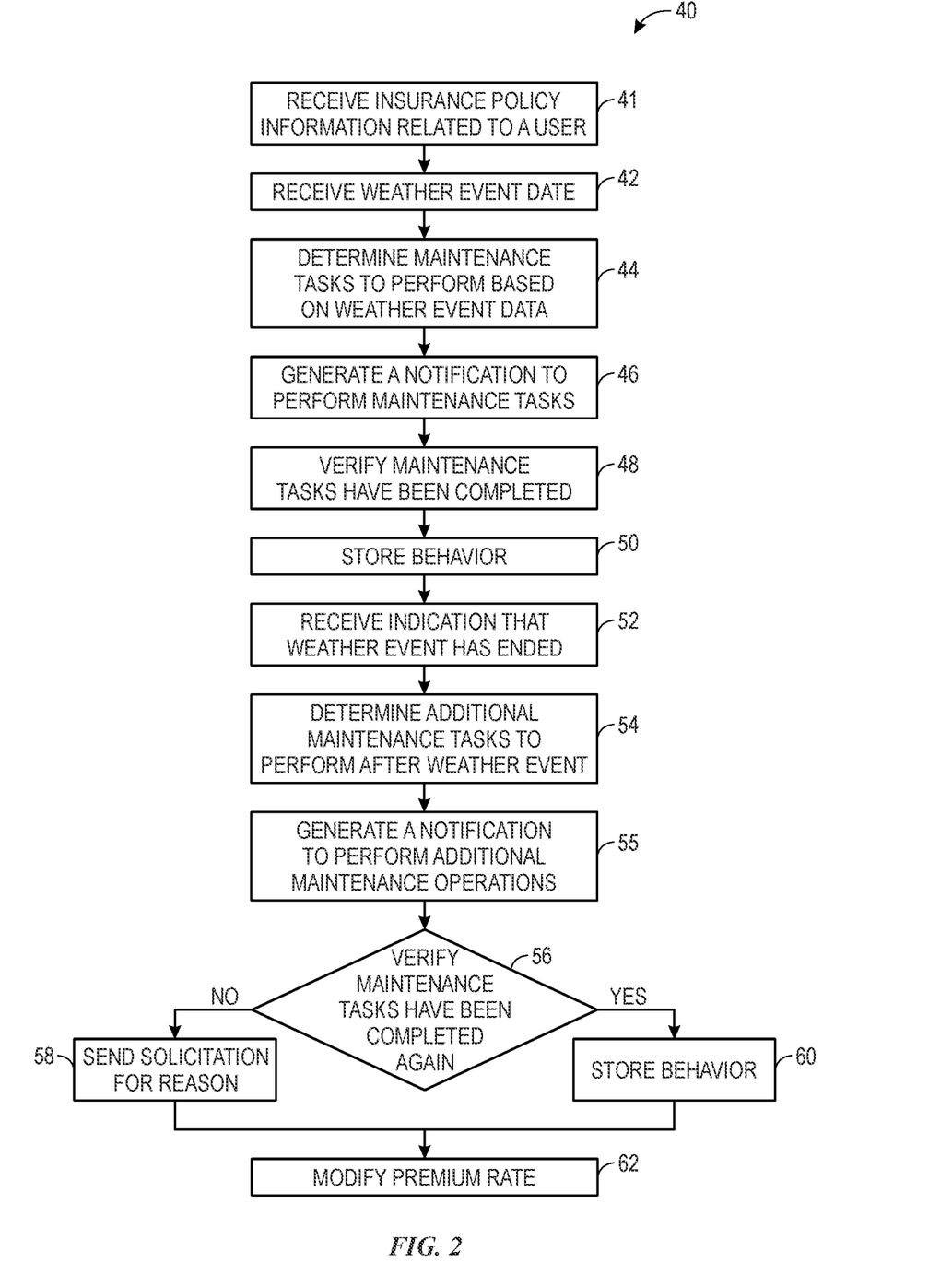
FIG. 2 illustrates a flow chart of a method for determining that maintenance has been completed before and after a weather event based on the data acquired from data sources of FIG. 1, in accordance with embodiments described herein.

With this in mind, FIG. 2 illustrates a flow chart of a method 40 for determining a variable premium rate based on the user's behavior data acquired during a weather event from the computing system 14, the sensors 28, the one or more smart devices 30, and the database 32, and the like. In general, the computing system 14 may receive information regarding the user for insurance, receive data regarding the user's completion of maintenance tasks, and determine the rate for a variable premium rate. The variable premium rate may be a rate the user may pay for the insurance policy that may fluctuate in amount based on the user's completion of certain recommended maintenance tasks. Although the method 40 is described in a particular order, it should be noted that the method 40 may be performed in any suitable order and is not limited to the order presented herein. It should also be noted that although each block is described below in the method 40 as being performed by the computing system 14, other suitable computing systems may perform the methods described herein.

Referring now to FIG. 2, at block 41 the computing system 14 may receive insurance policy information related to a user from the databases 32 or the like. The insurance policy information may include a list of property items that are secured by the insurance policy. In some embodiments, the insurance policy information may include internet protocol (IP) addresses for the property items, such that the computing system 14 may access a control system or controller for the respective property items to gather operational data or other suitable data based on requests sent to the respective IP addresses. Additionally, the insurance policy information may include a list of other devices, such as sensors 28 and smart devices 30, that may monitor or collect data associated with a condition or operation of the respective property item. For instance, the insurance policy information may indicate that a camera or image sensor may be positioned to monitor a vehicle covered by the respective insurance policy when the vehicle is positioned in a garage of a home. In any case, the insurance policy information may provide details related to property, such as a location of the property, operating parameters (e.g., power efficiency, memory storage) of the property, components used to track or monitor a condition of the property, and the like. In this way, the computing system 14 may guide a user with regard to maintaining the property based on any impending event.

With this in mind, at block 42, the computing system 14 may receive a first set weather event data based upon the geographical location of the insured property. That is, the insurance policy information may provide geographical location data regarding the property, such as the expected location of the property or information related to accessing location sensors disposed on the property. For example, if the property is a vehicle, the computing system 14 may detect location information of the vehicle by accessing the location sensors disposed on the vehicle.

The first set of weather event data may thus be related to weather events that are expected to occur within a threshold distance of the location of the property and within a certain amount of time. The first set of weather data may be received, by the network, 12 from such sources as news sources 26, databases 32, social media, or other publicly available sources that may provide information about the weather in the area. For example, the weather data may include a type of weather event (e.g., a hurricane, a tornado, a blizzard, or any weather event of similar nature) that is forecasted to approach the property.

After receiving the first set of weather event data, the computing system 14 may, at block 44, determine a first set of maintenance tasks to be performed to prepare the property for the weather event. That is, the computing system 14 may then retrieve property information stored in the memory 20 of the computing system 14, the database 32, or any combination thereof, to determine the first set of maintenance tasks to be performed in the user's property to prepare for the detected weather event. In some instances, a machine learning model may provide expected damages to various features (e.g., window, furniture, appliances, structure, equipment) of the property for certain types of weather events (e.g., window damage in a hurricane, mold build-up on a wall in a flood, freezing pipes during a freeze). The machine learning model may be generated over time as the computing system 14 receives weather event data and identifies patterns of types of damages sustained to different features of the property. For example, the computing system 14 may scan a user's home information stored in memory 20
and determine that the user's home has windows that may be susceptible to damage from nearby tree limbs during a weather event such as a hurricane. After this determination, the computing system 14 may further determine that a maintenance task for the user to complete is to board windows with plywood or some other material to prevent windows from breaking. It should be noted that while the example only includes one example task, the computing system 14 may provide a list of one or more tasks to the user. In any case, based on weather data or other events that are expected to occur near the insured property, the computing system 14 may determine a recommendation for the user to perform certain maintenance or preventative operations on the property.

After the determination of the first set of maintenance tasks has been made, the computing system 14 may generate a notification to perform the maintenance tasks and present the notification via the display 24, as indicated by block 46. The notification may cause the computing system 14 to open an application, which may allow the user to view tasks and their respective statuses of completion. In some embodiments, the application may provide directions to each respective task, instructions with regard to performing each task, and the like.

To verify that a maintenance task has been completed, as indicated by block 48, the computing system 14 may receive data representative of the user marking the task as complete within the application. In some embodiments, the notification may include a request to provide photo verification that the task has been completed. That is, in response to receiving the data representative of the user marking the task as complete, the computing system 14 may automatically open an image sensor application (e.g., a camera application) to capture photo verification of the completion of the task. Further, the computing system 14 may receive information from the user via the I/O ports 22, the network 12, the database 32, or other sources, and may utilize the information to verify that the user is performing the recommended maintenance tasks.

In addition to the user providing verification that the task has been completed, the sensors 28, the one or more smart devices 30, or any combination thereof may determine whether a task has been completed. For example, if the computing system 14 received an indication that a weather event was approaching, one of the maintenance tasks determined to be needed may be to "board up windows." In this case, the sensors 28 may be sensors with visual and audio capabilities. The sensors 28 may be positioned in certain places throughout the home where one or more windows are visible. The sensors 28 may record and/or take a snapshot of the one or more windows to determine whether the windows have been boarded in preparation for the weather event. In addition, the one or more smart devices 30 may be light sensors in rooms that have windows and may determine that the windows have been boarded up or covered due to a sharp decrease in natural light detected in the room. The sensors 28, the one or more smart devices 30, or any combination thereof may communicate with the network 12, which may then communicate computing system 14 that the task has been completed, via communication component 16. This advantageously allows for the task to be verified as complete without the user having to manually input it. After the task has been verified as complete, the computing system 14 may store the behavior in the memory 20 or within the database 32, as indicated by block 50.

At block 52, the computing system 14 may receive a second set of weather event data from such sources as news sources 26, databases 32, social media, or other publicly available sources that may provide information about the weather in the area. The second set of weather event data may indicate that the weather event has ended. This data may be communicated similarly to the process described above.

In some embodiments, after the weather event has ended, at block 54, the computing system 14 may determine additional maintenance operations to perform based on the weather event ending. The additional set of maintenance tasks to be performed after the weather event has finished may be determined based on the user's home information stored in the memory 20 of the computing system 14, the database 32, or any combination thereof and the particular weather event that transpired.

That is, certain maintenance operations are to be performed after a weather event ends to ensure that the property or occupants at the property are secure. For instance, the weather event may correspond to dry conditions in which a forest fire has been within a threshold distance of the property. In this case, the additional maintenance operations may include changing air filters at the property to ensure that particles in the air that may have circulated into the property from the fire are effectively filtered. The additional maintenance operations may also include removing or undoing the maintenance operations determined at block 44.

In any case, after determining the additional maintenance operations, at block 55, the computing system 14 may generate a notification for display via the display 24 to notify the user that weather event has ended and to perform the additional maintenance operations. This notification may also alert the user that there are unfinished maintenance tasks from the first set of maintenance tasks.

As indicated by block 56, the computing system 14 may verify that one or more maintenance tasks from the first set of maintenance task, the second set of maintenance tasks, or any combination thereof, has been completed. As such, the computing system 14 may receive inputs from the user, who may manually verify that the tasks has been done via methods disclosed above. In addition or alternatively, the sensors 28, the one or more smart devices 30, or any combination thereof may communicate with the network 12, which may then communicate computing system 14 that the task has been completed, via communication component 16. Regarding tasks left unfinished after the second notification, the computing system 14 may generate a prompt via the display 24 requesting a reason for the task not being completed, as indicated by block 58. For example, if one of the tasks was to "position yourself in a hallway and/or basement", the user may provide a photo of them in a bathtub, away from any windows, as an alternative to the suggested task. However, if the one or more tasks are verified to be completed by the user, the computing system 14 may store the behavior in the memory 20 or within the database 32, as indicated by block 60. The user's insurance premiums may be automatically adjusted based on a number or a percentage of the first set of maintenance tasks and/or the second set of maintenance tasks that have been completed after a particular time period (e.g., a day, a week, a month). For example, the first set of maintenance tasks may be required to be completed at least 3 days before the weather event occurs and the second set of maintenance tasks may be required to be completed at most 1 week after the weather event ends for the user's insurance premium to be positively affected. This may incentivize the user to complete the maintenance tasks suggested by the insurance provider.

In response to receiving the reasons or storing the behavior, the computing system 14 may dynamically modify the premium rate for the user, as indicated by block 62. In some embodiments, the computing system 14 may generate or send a notification to a user's computing device, such that the notification that automatically causes an application to execute and present a visualization on a user's device. In this way, the user may be notified in real time or near real time with regard to the change in the premium rate. Moreover, by limiting the transmission of the notification to instances that correspond to the premium rate changing, the present embodiments provide meaningful notifications and limits that transmission operations of the computing system 14 to enable the computing system 14 to preserve network bandwidth and consumer power more efficiently.

By using the techniques described above, the computing system 14 may receive behavior data that may related to an insurance policy for a user and associated property. In addition to protecting a value of the property, any physical structure, or object that may be covered by an insurance policy, the present embodiments described herein may be used to better enable the user to maintain safety protocols. That is, in some embodiments, the computing system 14 may provide notifications relating to a widespread health event. For instance, the computing system 14 may receive information related to a widespread health event occurring within a determined radius of the user and/or the user's home. Based on widespread health event data or other events that are expected to occur near the user, the computing system 14 may send a recommendation for the user to perform certain behaviors that promote the safety of the user. The computing system 14 may then detect via sensors 28 or other suitable devices whether the recommended behaviors were performed. The performance of these behaviors may indicate to the computing system 14 that the user is responsive to behavior recommendations and thus may be associated with less risky behavior that may result in a health compromise as compared to a user who is unresponsive to the recommendations.

Figure 3:
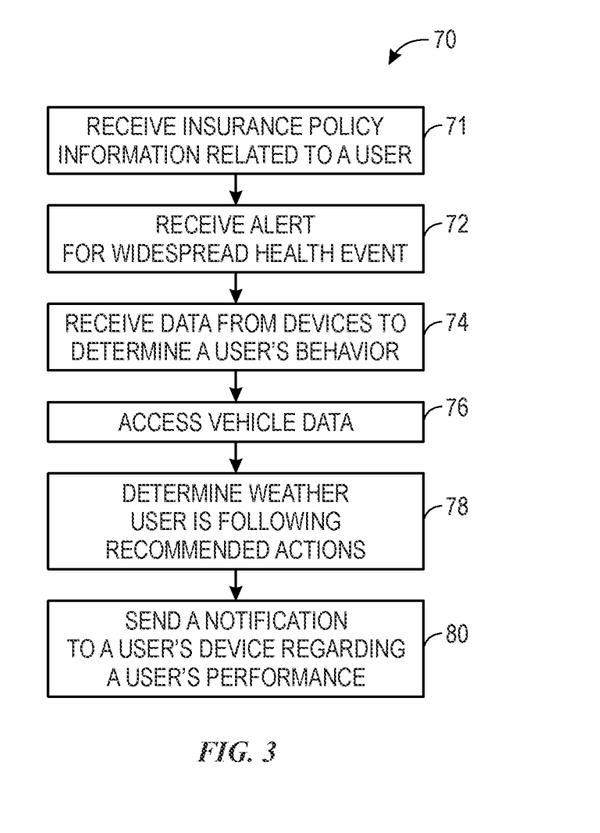
FIG. 3 illustrates a flow chart of a method for determining that a user is maintaining safety protocols during a widespread health event based on the data acquired from data sources of FIG. 1, in accordance with embodiments described herein.

Keeping this in mind, FIG. 3 illustrates a flow chart of a method 70 for dynamically determining or adjusting an insurance premium rate based on data corresponding to the user's accordance with safety protocols during a widespread health event. In general, the computing system 14 may receive information regarding the user's insurance policy, such as a health insurance policy. The insurance policy may include data regarding the user's expected health behavior (e.g., activity, daily steps, dietary restrictions) and a premium rate for the policy. The premium rate may fluctuate in amount based on the user's behavior. Indeed, in some situations, a user's behavior may be related to increased health risks for falling ill, contracting a virus, or the like. With this in mind, the method 70 may employ the computing system 14 to monitor the user's activity and generate recommendations to assist the user to remain safe during the health event. Although the method 70 is described in a particular order, it should be noted that the method 70 may be performed in any suitable order and is not limited to the order presented herein. It should also be noted that although each block is described below in the method 70 as being performed by the computing system 14, other suitable computing systems may perform the methods described herein.

Referring now to FIG. 3, at block 71, the computing system 14 may receive insurance policy information related to a user from the databases 32 or the like. The insurance policy information may information pertaining to health insurance of the user, as mentioned above. Additionally, the insurance policy information may include a list of other devices, such as sensors 28 and smart devices 30, that may monitor or collect data associated with a condition or operation of the respective property item. For instance, the insurance policy information may indicate that a camera or image sensor may be positioned to monitor how frequently the user leaves their home. In any case, the insurance policy information may provide details related to user, such as a location of the user, their age, any underlying health conditions, and the like. In this way, the computing system 14 may have access to data related to a user and may user the data to determine behavior recommendations related to maintaining safety protocols and their health based on any impending health event.

At block 72, the computing system 14 may receive an alert indicating that a health event is present in an area in which the user is located. The alert may be received, by the network, 12 from sources such as news sources 26, databases 32, social media, or other publicly available sources that may provide information about health events within a determined radius of the user. The health event alert may then be communicated from network 12 to the communication component 16 of the computing system 14. For example, the news sources 26 may send an alert indicating that residents within the area should remain in their homes and attempt to limit interactions with others. The health event may be related to a pandemic or virus that may be contagious and spreading in an area or the like. The alert may include behavior or action recommendations, specific to a particular geographic location of the user, for the user to perform that promote the safety of the user.

After receiving the alert, at block 74, the computing system 14 may receive data from various data sources to confirm that the user is performing the recommended actions. For example, the computing system 14 may detect via sensors 28 or other suitable devices whether the recommended actions were performed. The performance of these behaviors may indicate to the computing system 14 that the user is responsive to behavior recommendations and thus may be associated with less risky behavior that may result in a health compromise as compared to a user who is unresponsive to the recommendations.

In some embodiments, the computing system 14 may communicate with sensors 28, the one or more smart devices 30, or any combination thereof, via the network 12, to collect any of the data mentioned above. In some embodiments, the network 12 may be a Near-Field Communication (NFC), WiFi, or things of the like. The sensors 28 and the one or more smart devices 30 may be disposed in various locations around the user's home and vehicle. The sensors 28 may have audio and visual capabilities and thus may be used to confirm that the user is implementing certain recommended actions. For example, the recommended action may include maintaining more than a threshold distance from other individuals. As such, sensors 28, which may be disposed on a user, may monitor a space between other individuals in the presence of the user to determine whether the user is maintaining a safe distance.

In some embodiments, the one or more smart devices 30 disposed throughout the home may confirm the user's location. For example, the user may have smart lights installed in various rooms of the home that are communicatively connected to the computing system 14. The user may manually, or set up automatic, usage of the smart lights. After a particular smart light is turned on, the computing system 14 may determine that the user is within the area that corresponds to the smart light. In another example, the user may connect the computing system 14 to one or more smart speakers to control audio output to different parts of the home. After the computing system 14 is connected to the smart speakers, the user may initiate audio playback in one or more locations within the home. The one or more smart speakers where playback is initiated may indicate that the room is being occupied by the user. It should be noted that the sensors 28 and the one of more smart devices 30 may be used simultaneously. As such, multiple sensors 28 may be used to confirm a location of the user or proximity of individuals with respect to the user.

To further assist in determining whether the recommended actions are undertaken by the user, the computing system 14 may access data from a vehicle system 34, as indicated by block 76. The vehicle system 34 (which may be integrated with or include a vehicle) may monitor the operation of a vehicle. For instance, the vehicle system 34 may monitor the locations of the vehicle, frequency of use of the vehicle, times at which the vehicle is in use, the mileage driven by the vehicle, and the like. To track this information, the vehicle system 34 may include similar components as the computing system 14 described above. In addition, the vehicle system 34 and/or the computing system 14 may be communicatively coupled to one or more sensors 36 or devices within the vehicle to acquire data regarding the operation of the vehicle. By way of example, the vehicle system 34 may be communicatively coupled to a global positioning system (GPS) of the vehicle, an odometer of the vehicle, and other sensors that may provide information regarding the operation or location of the vehicle.

Although the vehicle system 34 and the database 32 are described as being communicatively coupled to the computing system 14 via the network 12, it should be noted that, in other embodiments, the vehicle system 34 and the database 32 may be communicatively coupled directly to the computing system 14.

In some embodiments the user may leave their home and the computing system 14 may receive data from the vehicle system 34 to determine locations that the user visited. The computing system 14 may analyze the location data to determine whether the location corresponds to a densely populated area. That is, the computing system 14 may retrieve population data, traffic data, popularity data, and the like from the database 32, the news sources 26, and the like to determine an expected number of individuals in a particular location.

Additionally, in some embodiments, the computing system 14 may send a request to a computing device (e.g., mobile phone, laptop, tablet) associated with the user to provide a user input regarding the user's performance of the recommended actions. That is, the user may provide inputs (e.g., pictures, checkboxes, typed responses) that indicate the user's performance of any particular action.

Based on the data acquired above, the computing system 14 may, at block 78, determine whether the user is performing the recommended actions provided in the alert. For example, the computing system 14 may determine whether the user is maintaining social distancing. When the computing system 14 determines that the user is not performing recommended actions (e.g., maintaining social distancing), the computing system 14 may generate a notification for display via the display 24 that notifies the user of their compliance to the recommended actions.

At block 80, the computing system 14 may send the notification to the user's computing device as described above. In some embodiments, the notification may include a summary of the user's activity over a time interval and an indication of the user's premium rate, which may be unchanged or lowered. As such, the notification may reinforce the benefits of maintaining social distancing on the user's insurance rate premium. In contrast, if the computing system 14 determines that the user has not maintained social distancing, the computing system 14 may send a notification that may illustrate the effect of ignoring the recommended actions, such as an increased premium rate. In some embodiments, the time interval may be determined based on protocols for a geographic location of the user. That is, the geographic location of the user may have heightened protocols (i.e., stay-at-home mandates) may indicate the beginning of the time interval, and the heightened protocols being repealed may be indicate the end of the time interval. As such, the user may be required to perform the recommended actions within the time interval for their premium rate to be lowered.

To prevent travel to densely populated areas (e.g., restaurants, grocery stores, bars, etc.), in some embodiments, the computing system 14 may send advertisements to download applications relating to food and grocery delivery. As such, the computing system 14 may generate notifications to help encourage or influence the user to perform the recommended actions.

Moreover, the computing system 14 may receive insurance policy data regarding a user and associated property. As mentioned above, the property may be any physical structure or object that may be covered by an insurance policy. To better enable the user to maintain the property, the computing system 14 may provide recommended maintenance or preventative operations for the user to perform in view of the need for preventative maintenance of the insured property. For instance, the computing system 14 may receive information related to a weather event approaching the insured property. Based on the need for maintenance other events that are expected to occur within a determined time interval, the computing system 14 may send a recommendation for the user to perform certain maintenance or preventative operations on the property. The computing system 14 may then detect via sensors 28 or other suitable devices whether the maintenance operations were performed. The performance of these maintenance operations may indicate to the computing system 14 that the user is responsive to maintenance requests and thus may be associated with less risky behavior that may result in damage to the property as compared to a user who is unresponsive to the recommendations.

Figure 4:
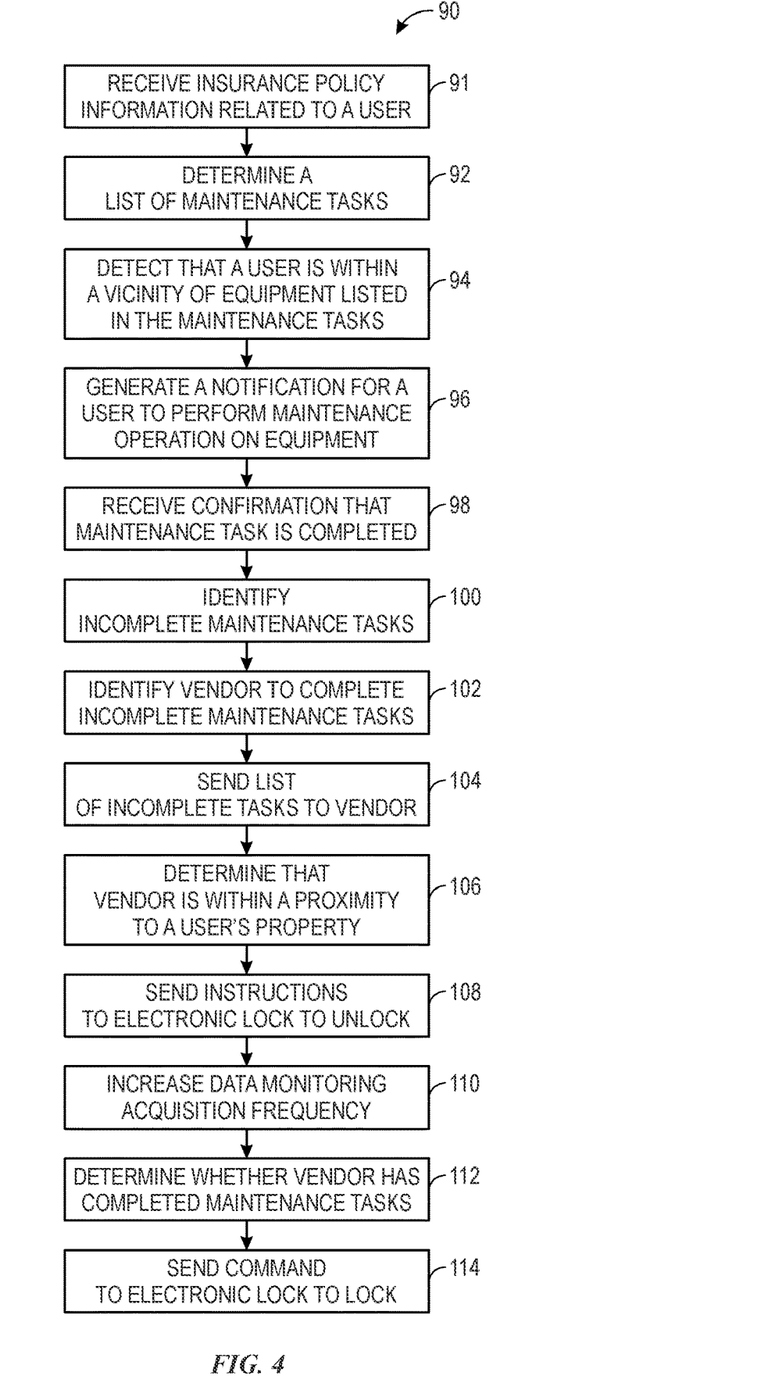
FIG. 4 illustrates a flow chart for scheduling and coordinating the completion of maintenance tasks within a property, in accordance with embodiments described herein.

With this in mind, FIG. 4 illustrates a flow chart of a method 90 for scheduling and coordinating the completion of maintenance tasks within a property. In general, the computing system 14 may receive information regarding the user for insurance, receive data regarding the user's completion of maintenance tasks, and determine the rate for a personal variable premium rate. The personal variable premium rate may be a rate the user may pay for the insurance policy that may fluctuate in amount based on the user's completion of maintenance tasks.

Although the method 90 is described in a particular order, it should be noted that the method 90 may be performed in any suitable order and is not limited to the order presented herein. It should also be noted that although each block is described below in the method 90 as being performed by the computing system 14, other suitable computing systems may perform the methods described herein.

Referring now to FIG. 4, at block 91, the computing system 14 may receive insurance policy information related to a user from the databases 32 or the like. The insurance policy information may include a list of property items that are secured by the insurance policy. In some embodiments, the insurance policy information may include internet protocol (IP) addresses for various devices located at the property, such that the computing system 14 may access a control system or controller for the respective property items to gather operational data. Additionally, the insurance policy information may include a list of other devices, such as the sensors 28 and the smart devices 30, that may monitor or collect data associated with a condition or operation of the respective property. For instance, the insurance policy information may indicate that a camera or image sensor may be positioned to monitor a door on an entryway to the home covered by the respective insurance policy. In any case, the insurance policy information may provide details related to property, such as a location of the property, operating parameters (e.g., power efficiency, memory storage) of the property, components used to track or monitor a condition of the property, and the like.

The computing system 14 may determine a list of maintenance tasks, as indicated by block 92. The list of maintenance tasks may include tasks routinely performed to maintain property. The computing system 14 may use the user's property information to determine which maintenance tasks to perform. For example, the computing system 14 may determine that the user's property has a two car garage door that uses a chain with a certain lifespan or that should be maintained. After this determination, the computing system 14 may further determine that a maintenance task for the user to complete is to add grease to the garage door rails. It should be noted that while the example only includes one example task, the computing system 14 may provide a list of one or more tasks to the user.

At block 94, the computing system 14 may detect that the user is within a vicinity of equipment listed in the maintenance tasks. In some embodiments, the vicinity may be defined as a certain room within the property. In yet another embodiment, the vicinity may be defined as a certain distance from the equipment (e.g., 1 foot, 2 feet, 3 feet, etc.). Using the same example mentioned above, the user may enter the garage and a sensor 28 disposed in the garage may communicate with the computing system 14. The computing system 14 may then determine that that the user is within the vicinity of the garage door based on the data from the sensor 28 and generate a notification to perform a maintenance operation, as indicated by block 96. Using the user's location to prompt the performance of maintenance on equipment allows the user to complete maintenance in a convenient manner when the user is within a proximity of the equipment. The notification may be generated to notify the user as discussed above in a timely manner while the user is within the threshold distance of the equipment.

The completion of one or more maintenance tasks may be verified using techniques mentioned above at block 48. After the completion of one or more maintenance tasks has been completed or verified, the computing system 14 may receive confirmation that the one or more maintenance tasks have been completed, as indicated by block 98.

The computing system 14 may then identify the incomplete maintenance tasks, as indicated by block 100. In some embodiments, the computing system 14 may identify the incomplete maintenance tasks by removing completed tasks from the list of maintenance tasks determined at block 92. The incomplete tasks may be the remaining tasks not completed within some time interval from the initial determination of maintenance tasks at block 92. For example, the list of maintenance tasks may include adding grease to the garage door rail, replace bathroom faucets, and change air filters. However, if the computing system 14 only receives confirmation that the user has completed the task of adding grease to the garage door railing, then the computing system 14 may identify replacing bathroom faucets and changing air filters as incomplete.

At block 102, the computing system 14 may identify vendors capable of completing the incomplete or remaining maintenance tasks. The computing system 14 may identify the vendors based on a list of verified vendors stored in the database 32. In some embodiments, the vendors may be related to or may advertise services including the incomplete tasks. Continuing the previous example, the computing system 14 may identify a specific plumbing vendor to complete the task of replacing bathroom faucets. In some embodiments, the vendor may include a general contractor or service company that performs general maintenance tasks.

After the computing system 14 identifies the vendor to complete the incomplete tasks, the list of incomplete maintenance tasks may be sent to the respective vendors, as indicated by block 104. For example, if one of the one or more incomplete maintenance tasks is to "change the pool filter" one of the identified vendors may be a local pool cleaning service, identified using the factors above. The computing system 14 may then send a request to the vendor requesting a pool filter change. In general, the computing system 14 may then schedule a time to complete the service in accordance with the user's schedule. If the user will be present at the property during the scheduled service time, the user may grant the vendor access to the property.

The computing system 14 may also enable the vendor to access the home regardless of the user being present. For example, the computing system 14 may determine that the vendor is within a proximity to the user's property, as indicated by block 106. The determination may be made using sensors 28, disposed on the exterior of the property that may identify the respective vendors by audio, visual, or any combination thereof. For example, a camera-enabled doorbell may identify a vendor based on a logo on their uniform or the vendor personnel may give a vocal indication of who they are.

At block 108, the computing system 14 may send instructions to one or more electronic locks to unlock and allow the vendor access to the property. The instructions may be sent only after the determination that the vendor is within the proximity of the user's property. The instructions may also specify which electronic locks of the user's property are to be unlocked. In some embodiments, the computing system 14 may send instructions may to unlock each of the electronic locks of the user's property. In other embodiments, the computing system 14 may send instructions may specify that only the electronic locks permitting access to a certain area within the user's property may be unlocked. For example, the computing system 14 may send instructions that may unlock an electronic lock of a guest house but not the electronic locks of the main house. In this case, the vendor will only be permitted access to the guest house and not other portions of the house.

To ensure that the user's property is safe while the vendor is present, the computing system 14 may increase data monitoring acquisition frequency, as indicated by block 110. The increase in data monitoring acquisition frequency may include receiving more feedback from the sensors 28 disposed within the property where the vendor is performing the maintenance task. For example, when the vendor is performing the maintenance task in the guest house of the user's property, the computing system 14 may receive more data from the sensors 28 disposed within the guest house, in comparison to the sensors 28 disposed in the main house.

In addition, the computing system 14 may determine whether the vendor has completed the maintenance tasks, as indicated by block 112. The computing system 14 may determine the vendor's completion of the maintenance tasks by the process described above by block 48. In some embodiments, the computing system 14 may determine that the vendor did not complete the maintenance task. The computing system 14 may send a notification to the vendor to return to complete the task.

After the determination has been made relating to the vendor's completion of the maintenance tasks, the computing system 14 may send a command to the one or more electronic locks to lock. The computing system 14 may send the command to one or more electronic locks only in the areas of the user's property where the vendor was performing the maintenance. In some embodiments, the computing system 14 may send a command to each of the electronic locks of the user's property to lock. For example, the computing system 14 may send the command to lock the electronic locks of the guest house where the vendor was completing a maintenance task and send an additional command to lock the electronic lock of the main house. Allowing vendors into the property while the user is away may be an attractive option to the user because it allows for the incomplete maintenance tasks to be completed with minimal effort from the user. The completion of the incomplete maintenance tasks by vendors may also positively affect the user insurance premium rate.

The technical effects of the systems and methods described herein include using data acquired from various sensors and one or more smart devices 30 to determine a user's insurance premium rate based on an applicant's lifestyle and completion of maintenance with the home, and to adjust the insurance premium rate in real-time based on changes in the applicant's accordance with health protocols, behavior, and completion of maintenance within the home. Providing the user with a transparent and flexible premium rate formula may enable the user to control the cost of their insurance and may enable the applicant to make informed decisions about home and personal safety.

Moreover, the present embodiments disclosed herein address problems associated with collecting data such as using the data available via sensors and smart devices to provide sufficient insurance coverage for a user based specifically on the user's behavior and home maintenance. Furthermore, the present embodiments improve the accuracy in determining an appropriate rate premium for a user and their home by accounting for the maintenance done to the home and the user's personal health, as opposed to classifying users in a general grouping of expected behavior. In addition, the present embodiments allow a user to view data regarding driving home and personal maintenance and rates associated therewith in an efficient manner without having to navigate through various access points, websites, or the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method, comprising:
retrieving, via a processor, insurance information associated with a user, wherein the insurance information is indicative of a premium rate and a property;
receiving, via the processor, one or more alerts regarding a weather event that will occur within a determined radius of the property within a period of time, wherein the one or more alerts are received in real time from one or more electronic news sources;
determining, via the processor, a list of actions for the user to perform on the property based on the weather event and a machine learning model representative of one or more relationships between one or more expected damage types to the property and one or more weather events, wherein the list of actions comprises a first set of actions to perform before the weather event occurs and a second set of actions to perform after the weather event occurs;
sending, via the processor, the list of actions to a computing device associated with the user, wherein the computing device is configured to execute an application in response to receiving the list of actions, wherein the application is configured to generate and display a notification comprising the list of actions via an electronic display of the computing device;
automatically receiving, via the processor, one or more datasets representative of one or more light measurements within one or more portions of the property from one or more sensors disposed within the one or more portions of the property after sending the list of actions and independent of the user, wherein the one or more portions of the property are specified in at least one action of the list of actions;
determining, via the processor, that the at least one action is complete based on the one or more datasets indicating that the one or more light measurements have changed more than one or more thresholds;
sending, via the processor, a request to a vendor system for completing at least one additional action from the list of actions that is not complete;
detecting, via the processor, that a vendor associated with the vendor system is within a proximity of the property based on image data acquired by a camera positioned outside the property;
sending, via the processor, a command to an electronic lock in response to identifying the vendor via the image data, wherein the command is configured to cause the electronic lock to open; and
adjusting, via the processor, the premium rate in response to the at least one action, the at least one additional action, or both being completed.

2. The method of claim 1, comprising:
determining, via the processor, at least one time that the at least one action has been completed based on the one or more datasets; and
adjusting, via the processor, the premium rate in response to the at least one time being before at least one time deadline.

3. The method of claim 1, comprising:
sending, via the processor, one or more commands to the one or more sensors to collect the one or more datasets, wherein the insurance information comprises one or more internet protocol (IP) addresses for the one or more sensors, and wherein the one or more commands are sent to the one or more sensors based on the IP addresses.

4. The method of claim 1, wherein the list of actions for the user to perform on the property is determined based on a relationship between the event and expected damage to one or more features of the property.

5. The method of claim 1, comprising:
receiving, via the processor, an indication that the at least one action is complete via a user input by the user; and
sending, via the processor, a request to the computing device in response to receiving the user input, wherein the request is configured to cause the computing device to activate an image sensor on the computing device for the user to acquire the one more datasets.

6. The method of claim 1, comprising:
receiving, via the processor, an indication that the event has ended;
sending, via the processor, an additional list comprising the second set of actions to the computing device associated with the user;
receiving, via the processor, one or more additional datasets representative of one or more additional portions of the property from the one or more sensors, wherein the one or more additional portions of the property are specified in the second set of actions;
determining, via the processor, that the second set of actions is complete based on the one or more additional datasets; and
adjusting, via the processor, the premium rate in response to the second set of actions being completed, wherein the at least one action is part of the first set of actions.

7. The method of claim 6, comprising:
determining, via the processor, at least one additional time that the second set of actions has been completed based on the one or more additional datasets; and
adjusting, via the processor, the premium rate in response to the at least one additional time being before at least one additional time deadline.

8. A system, comprising:
one or more sensors configured to acquire image data associated with one or more portions of a property; and
a processor configured to:
retrieve insurance information associated with a user, wherein the insurance information is indicative of a premium rate and a property;
receive one or more alerts regarding a weather event that will occur within a determined radius of the property within a period of time, wherein the one or more alerts are received in real time from one or more electronic news sources;
determine a list of actions for the user to perform on the property based on the weather event and a machine learning model representative of one or more relationships between one or more expected damage types to the property and one or more weather events, wherein the list of actions comprises a first set of actions to perform before the weather event occurs and a second set of actions to perform after the weather event occurs;

send the list of actions to a computing device associated with the user, wherein the computing device is configured to execute an application in response to receiving the list of actions, wherein the application is configured to generate and display a notification comprising the list of actions via an electronic display of the computing device;

automatically receive one or more datasets representative of one or more light measurements within one or more portions of the property from the one or more sensors disposed within the one or more portions of the property after sending the list of actions and independent of the user, wherein the one or more portions of the property are specified in at least one action of the list of actions;

determine that the at least one action is complete based on the one or more datasets indicating that the one or more light measurements have changed more than one or more thresholds;

send a request to a vendor system for completing at least one additional action from the list of actions that is not complete;

detect that a vendor associated with the vendor system is within a proximity of the property based on image data acquired by a camera positioned outside the property;

send a command to an electronic lock in response to identifying the vendor via the image data, wherein the command is configured to cause the electronic lock to open; and adjust the premium rate in response to the at least one action, the at least one additional action, or both being completed.

9. The system of claim 8, wherein the processor is configured to:

determine at least one time that the at least one action has been completed based on the one or more datasets; and adjust the premium rate in response to the at least one time being before at least one time deadline.

10. The system of claim 8, wherein the processor is configured to:

send one or more commands to the one or more sensors to collect the one or more datasets, wherein the insurance information comprises one or more internet protocol (IP) addresses for the one or more sensors, and wherein the one or more commands are sent to the one or more sensors based on the IP addresses.

11. The system of claim 8, wherein the list of actions for the user to perform on the property is determined based on a relationship between the event and expected damage to one or more features of the property.

12. The system of claim 8, wherein the processor is configured to:

receive an indication that the at least one action is complete via a user input by the user; and send a request to the computing device in response to receiving the user input, wherein the request is configured to cause the computing device to activate an image sensor on the computing device for the user to acquire the one more datasets.

13. The system of claim 8, wherein the one or more alerts regarding an event are received from one or more databases, social media, or any combination thereof.

* * * * *